United States Patent
Hashemi et al.

(10) Patent No.: US 8,011,813 B2
(45) Date of Patent: Sep. 6, 2011

(54) ACTUATOR SYSTEM FOR A LIGHTING SYSTEM

(75) Inventors: Masoud Hashemi, Canton, MI (US);
Dylan Schickel, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 436 days.

(21) Appl. No.: 12/364,680

(22) Filed: Feb. 3, 2009

(65) Prior Publication Data
US 2010/0195336 A1    Aug. 5, 2010

(51) Int. Cl.
*F21V 33/00* (2006.01)
(52) U.S. Cl. .......................... 362/359; 362/358
(58) Field of Classification Search ............ 362/359, 362/358
See application file for complete search history.

(56) References Cited

U.S. PATENT DOCUMENTS

| | | | |
|---|---|---|---|
| 6,698,905 B1 | 3/2004 | Whitehead | |
| 7,104,663 B2 | 9/2006 | Whitehead | |
| 7,241,038 B2 * | 7/2007 | Naniwa et al. | 362/525 |
| 7,370,983 B2 | 5/2008 | DeWind et al. | |
| 7,914,447 B2 * | 3/2011 | Kanai | 600/160 |
| 2001/0036082 A1 * | 11/2001 | Kanesaka | 362/555 |
| 2006/0050018 A1 | 3/2006 | Hutzel et al. | |
| 2007/0002477 A1 | 1/2007 | Whitehead | |
| 2008/0062700 A1 * | 3/2008 | Hayashi et al. | 362/294 |

* cited by examiner

*Primary Examiner* — Laura Tso
(74) *Attorney, Agent, or Firm* — Fraser Clemens Martin & Miller LLC; J. Douglas Miller

(57) ABSTRACT

An actuator system for a lighting system includes a shape memory alloy coupled to a component of the lighting system to control an actuation of the component and thereby produce a plurality of light patterns and an electrical control circuit in electrical communication with the shape memory alloy to selectively provide an electrical current to the shape memory alloy for controlling a physical property of the shape memory alloy and thereby the motion of the component of the lighting system.

20 Claims, 4 Drawing Sheets

ACTUATOR SYSTEM FOR A LIGHTING SYSTEM

FIELD OF THE INVENTION

The invention relates to lighting systems. More particularly, the invention is directed to an actuator system for a lighting system to produce a plurality of light patterns.

BACKGROUND OF THE INVENTION

Currently, some automotive headlamps utilize a solenoid to provide actuation of a high/low beam shield to produce a plurality of light patterns. However, solenoids create an electromagnetic field, which along with fly back voltage, causes various manufacturing and operational issues. Additionally, solenoids require a relatively large amount of package space. While these problems can be overcome, the current solutions are costly. Further, the cost and above-referenced limitations typically prevent the implementation of moving elements in other lighting systems.

Electromagnetic compatibility (EMC) problems associated with solenoid-based actuators are typically resolved by adding parts to transfer the electromagnetic charge to an appropriate ground plane. Fly back voltage issues are typically resolved by adding components to control and regulate the voltage. The addition of parts and components for resolving the EMC and voltage increase the overall cost of the system. Solenoids are typically packaged inside the headlamp assembly, limiting the ability to package other functional or visual elements. Additionally, certain systems may have space, structural, and electric limitations which impede the implementation of the conventional solutions.

It would be desirable to develop an actuator system for a lighting system to produce a plurality of light patterns, wherein the actuating system minimizes the electromagnetic compliance and voltage issues associated with solenoid-based actuators and minimizes a package space requirement.

SUMMARY OF THE INVENTION

Concordant and consistent with the present invention, an actuator system for a lighting system to produce a plurality of light patterns, wherein the actuating system minimizes the electromagnetic compatibility and voltage issues associated with solenoid-based actuators and minimizes a package space requirement, has surprisingly been discovered.

In one embodiment, an actuator system for a lighting system comprises: a shape memory alloy coupled to a component of the lighting system to control an actuation of the component and thereby produce a plurality of light patterns; and an electrical control circuit in electrical communication with the shape memory alloy to selectively provide an electrical current to the shape memory alloy for controlling a physical property of the shape memory alloy and thereby the motion of the component of the lighting system.

In another embodiment, a light control system comprises: a light source for emitting a plurality of light rays; a beam modifier disposed in a path of the light rays for creating a light pattern; a shape memory alloy coupled to at least one of the light source, the beam modifier, and a static surface, wherein the shape memory alloy controls the motion of at least one of the light source and the beam modifier; and an electrical control circuit in electrical communication with the shape memory alloy to selectively provide an electrical current to the shape memory alloy to cause a motion of the shape memory alloy and thereby the motion of at least one of the light source and the beam modifier to modify the light pattern created by the beam modifier.

In another embodiment, a light control system comprises: a light source for emitting a plurality of light rays; a beam modifier disposed in a path of the light rays for creating a light pattern; and an actuator system including: a main body having an attachment portion and a guide portion, wherein the attachment portion is coupled to the beam modifier; an actuator guide having a cavity formed therein for receiving the guide portion of the main body to direct a motion of the main body; a biasing device disposed between the main body and the actuator guide; a shape memory alloy coupled to the main body and at least one of the actuator guide and a static surface, wherein the shape memory alloy controls the motion of the main body and thereby the motion of the beam modifier; and an electrical control circuit in electrical communication with the shape memory alloy to selectively provide an electrical current to the shape memory alloy for controlling a physical property of the shape memory alloy and thereby the motion of the main body.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
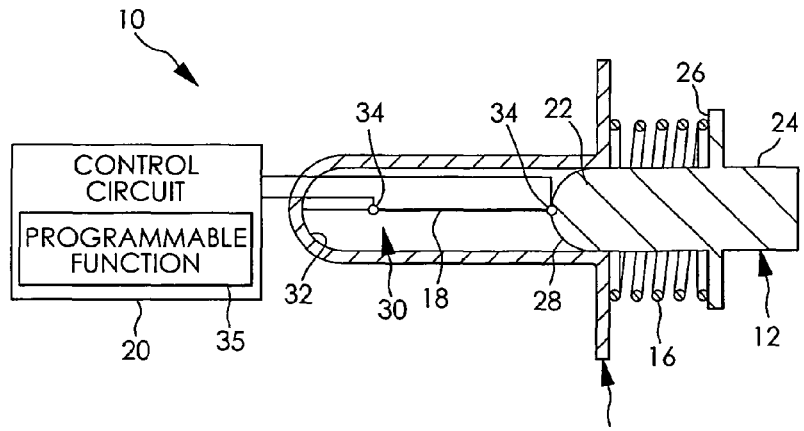
FIG. 1 is a schematic cross sectional view of an actuator system according to an embodiment of the present invention.

FIG. 1 shows an actuator system 10 according to an embodiment of the present invention. As shown, the actuator system 10 includes a main body 12, an actuator guide 14, a biasing element 16, a shape memory alloy 18, and a control circuit 20.

The main body 12 is typically formed from a metal. However, other materials such as a rigid plastic may be used. The main body 12 includes a guide portion 22 and an attachment portion 24. As shown, the guide portion 22 has a substantially 'T' shape having a biasing surface 26 spaced from a first end 28 of the guide portion 22. In the embodiment shown, the first end 28 has a substantially arcuate shape. However, the guide portion 22 may have any shape and size. The first end 28 of the guide portion 22 is disposed in a cavity 30 defined by a wall 32 of the actuator guide 14. As such, the guide portion 22 cooperates with the actuator guide 14 to direct and guide a motion of the main body 12. As a non-limiting example, the motion of the main body 12 is limited to a linear motion in a single dimension. In certain embodiments, the attachment portion 24 of the main body 12 is coupled with a component of a vehicle headlamp system for controlling the actuation of the component to control a light pattern of the lighting system. It is understood that the control of the light pattern may include at least one of a modification to the direction of light rays, an intensity of emitted light, a color of emitted light, a blockage of light rays, and a distribution pattern of light rays. It is further understood that the attachment portion 24 may be coupled to any component such as, a shield, a light source, a lens, a reflector, and a beam modifier, for example.

The actuator guide 14 is formed to receive the guide portion 22 of the main body 12. Specifically, the wall 32 of the actuator guide 14 defines the cavity 30 having a shape suitable for receiving the guide portion 22 of the main body 12. In certain embodiments, the actuator guide 14 is formed in at least one of a housing, a bracket, and a reflector of a headlamp system for a vehicle. However, it is understood that the actuator guide 14 may be separately formed and later integrated into a vehicle system by coupling the actuator guide 14 to a fixed surface.

The biasing element 16 is disposed between a portion of the wall 32 of the actuator guide 14 and the biasing surface 26 of the main body 12. As a non-limiting example, the biasing element 16 is a spring having a pre-determined spring constant. However, other biasing elements may be used such as a shape memory alloy or other directional force generating device.

The shape memory alloy 18 is disposed in the cavity 30 defined by the wall 32 of the actuator guide 14. The shape memory alloy 18 is coupled to the first end 28 of the guide portion 22 of the main body 12 and an interior surface of the wall 32 of the actuator guide 14. Any conventional means for coupling the shape memory alloy 18 may be used such as a ring terminal and a barrel crimp, for example. As shown, the shape memory alloy 18 is a wire having a plurality of electrodes 34 for receiving an electrical current from the control circuit 20. It is understood that the shape memory alloy 18 may have any shape, size, and quantity of shape memory alloy elements.

The control circuit 20 is in electrical communication with the shape memory alloy 18. Specifically, the control circuit 20 selectively provides an electrical current to the electrodes 34 of the shape memory alloy 18. It is understood that the control circuit 20 may be in electrical communication with other components such as a source of electrical energy. It is further understood that the control circuit 20 may include a programmable function 35 for controlling the transmission of electrical current to the electrodes 34 of the shape memory alloy 18.

In use, the actuator system 10 is coupled to a moveable component of a lighting system such a vehicle headlamp system, for example. As such, the actuator system 10 controls a movement of the moveable component based upon the contraction and expansion of the memory shape alloy 18. In certain embodiments, an electric current is transmitted to the memory shape alloy 18, thereby causing a fluctuation in length of the shape memory alloy 18. As a non-limiting example, the actuator system 10 is coupled to an optics component of a lighting system for modifying a light pattern generated by the lighting system. It is understood that the modification may include a change in direction, intensity, color, or overall distribution of a plurality of light rays emitted by the lighting system. Other modifications can be made, as desired. As a further example, the actuator system 10 may be coupled to a light source for controlling a position of the light source relative to an adjacent optics component. In certain embodiments, the actuator system 10 controls the high beam and low beam functions of a vehicle headlamp system. It is understood that the actuator system 10 may be coupled to one or more lighting system components, a light source, or optical devices, for example.

Figure 2:
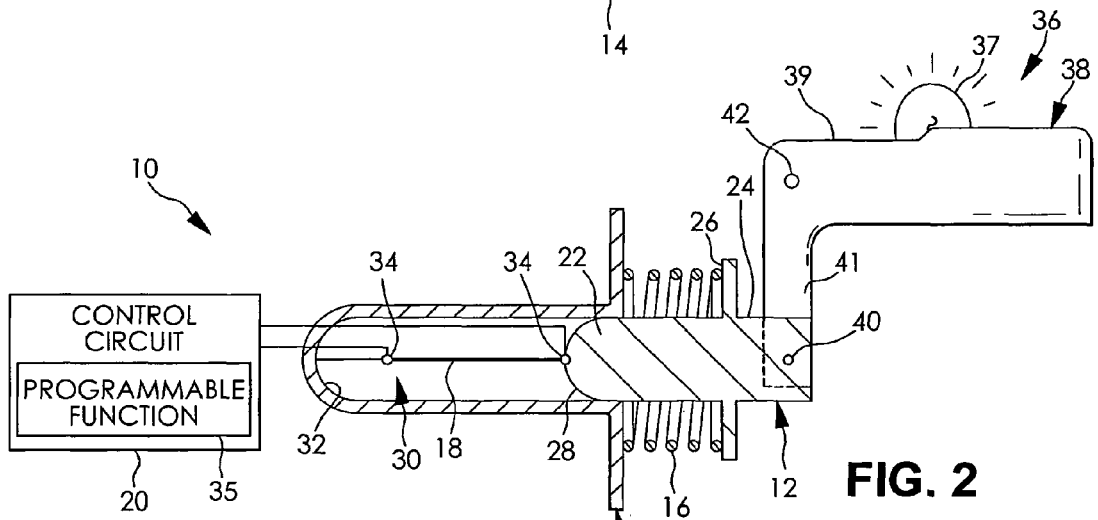
FIG. 2 is a schematic front elevational view of a light control system coupled to the actuator system of FIG. 1 according to another embodiment of the present invention, the actuator system shown in section and the light control system shown in a default position.
Figure 3:
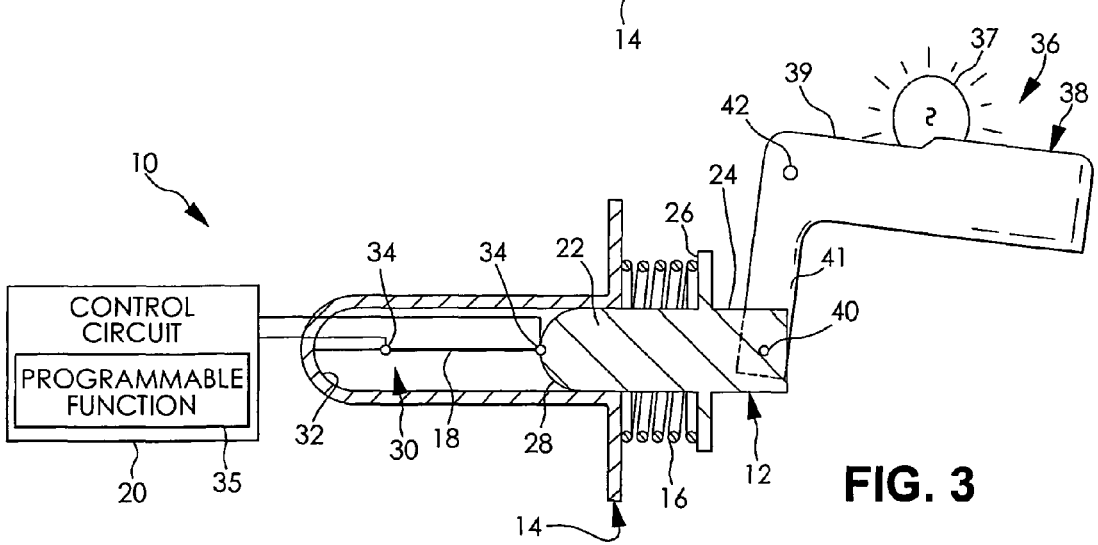
FIG. 3 is a schematic front elevational view of the light control system of FIG. 2 coupled to the actuator system of FIG. 1, the actuator system shown in section and the light control system shown in a contracted position.

FIGS. 2 and 3 show the actuator system 10 coupled to a light control system 36 according to another embodiment of the present invention. The light control system 36 includes a light source 37 and a beam modifier 38. The light source 37 is a conventional vehicle headlamp bulb. However, any light source may be used such as a light emitting diode, for example.

The beam modifier 38 includes an integrated lever arm 41, together forming a substantially "L" shaped element. As a non-limiting example, the beam modifier 38 further includes at least one of a shield (to block portions of a light beam emitted from the light source 37), a reflector (to reflect a portion of the light beam and optionally direct the reflected light rays to create a specific beam pattern/image), a lens (to direct light rays to form a specific beam pattern/image), and a filter (to modify the spectral characteristics of the light beam). As shown, the beam modifier 38 is a shield is with a substantially horizontal cut off line with a stepped edge 39 to create a desired lighting pattern. However, it is understood that the beam modifier 38 may have any shape, size and features for controlling a modification of light rays. The beam modifier 38 further includes a coupling element 40 for rotatably coupling the beam modifier 38 to the main body 12 the actuator system 10. The coupling element 40 may be any device for rotatably coupling the beam modifier 38 such as a rotatable rivet, for example. It is understood that in certain embodiments, the shape memory alloy 18 is coupled to at least one of the light source 37 and the beam modifier 38.

In use, the attachment portion 24 of the main body 12 of the actuator system 10 is coupled to the beam modifier 38 to control a rotational motion of the beam modifier 38 about an axis 42 and thereby modify a plurality of light rays emitted from the light source 37. Specifically, FIG. 2 shows the actuator system 10 in a default or "biased" position, wherein the beam modifier 38 creates a first lighting pattern. Specifically, the biasing element 16 applies a force to the main body 12 in a direction away from actuator guide 14, thereby rotating the beam modifier 38 into the default position. FIG. 3 shows the actuator system 10 in a contracted position, wherein an electric current is applied to the shape memory alloy 18 to contract a length of the shape memory alloy 18, thereby compressing the biasing element 16 and causing the main body 12 to retract further into the cavity 30. As such, the beam modifier 38 is rotated clockwise about the axis 42 to create a second light pattern. It is understood that the beam modifier 38 may be positioned in any number of positions relative to the light source 37 to create any number of light patterns. It is further understood that a position of the light source 37 relative to the beam modifier 38 may be adjusted to create any number of light patterns.

Figure 4:
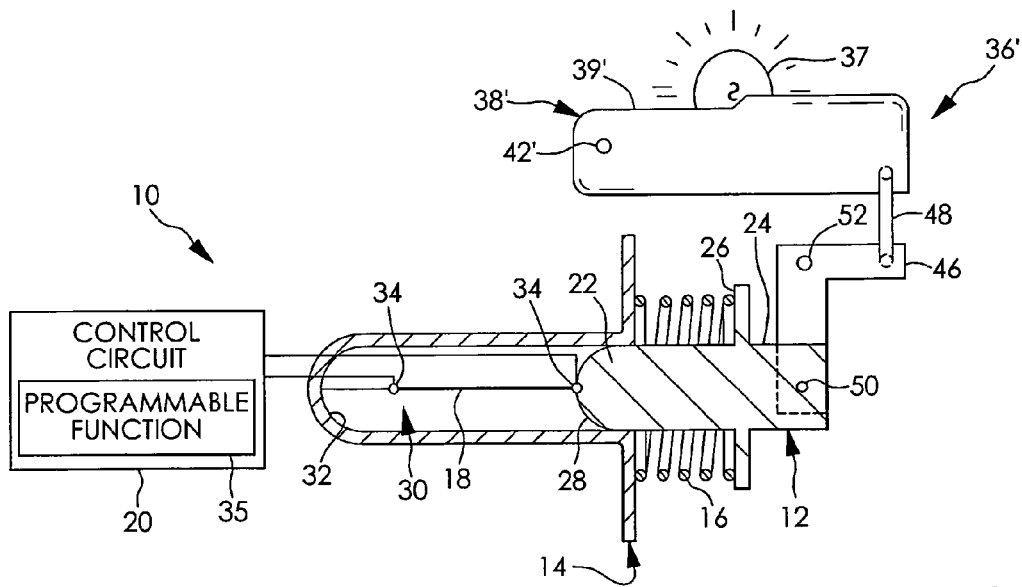
FIG. 4 is a schematic front elevational view of a light control system coupled to the actuator system of FIG. 1 according to another embodiment of the present invention, the actuator system shown in section and the light control system shown in a default position.
Figure 5:
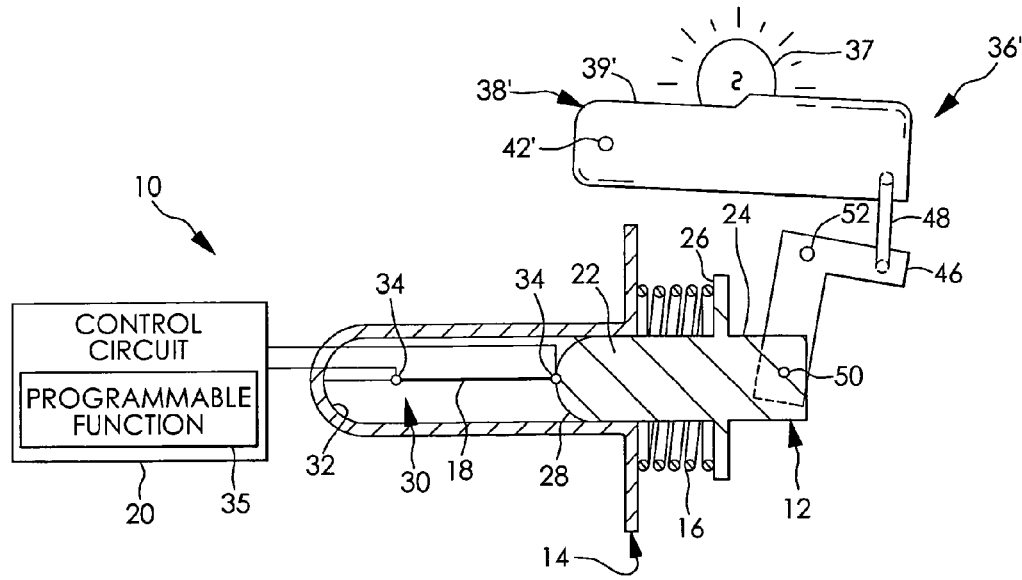
FIG. 5 is a schematic front elevational view of the light control system of FIG. 4 coupled to the actuator system of FIG. 1, the actuator system shown in section and the light control system shown in a contracted position.

FIGS. 4 and 5 show the actuator system 10 coupled to a light control system 36' according to another embodiment of the present invention similar to the light control system 36 of FIGS. 2 and 3, except as described below. Structure repeated from the description of FIGS. 2 and 3 includes the same reference numeral. Variations of structure shown in FIGS. 2 and 3 include the same reference numeral and a prime (') symbol.

As shown in FIGS. 4 and 5, the light control system 36' includes a beam modifier 38', a rotational element 46, and a coupling rod 48. As a non-limiting example, the beam modifier 38' includes at least one of a shield (to block portions of a light beam emitted from the light source 37), a reflector (to reflect a portion of the light beam and optionally direct the reflected light rays to create a specific beam pattern/image), a lens (to direct light rays to form a specific beam pattern/image), and a filter (to modify the spectral characteristics of the light beam). As shown, the beam modifier 38' has a stepped edge 39' for modifying a plurality of light rays emitted from the light source 37. However, it is understood that the beam modifier 38' may have any shape, size and features for controlling a modification of the light rays.

The rotational element 46 has a substantially "L" shape. However, other shapes and sizes may be used. The rotational element 46 further includes a coupling element 50 for rotatably coupling the rotational element 46 to the main body 12 the actuator system 10. The coupling element 50 may be any device for rotatably coupling the rotational element 46 such as a rotatable rivet, for example.

The coupling rod 48 is rotatably coupled to the beam modifier 38' and the rotational element 46. It is understood that the coupling rod 48 may have any shape and size and may be coupled to the beam modifier 38' and the rotational element 46 using any rotatable coupling means, such as a rivet, for example.

In use, the attachment portion 24 of the main body 12 of the actuator system 10 is coupled to the rotational element 46 to control a rotational motion of the rotational element 46 about an axis 52. As the rotational element 46 rotates about the axis 52, the coupling rod 48 guides the beam modifier 38' along a pre-determined motion path. It is understood that the specific motion path of the beam modifier 38' may be adapted for various systems and structural constraints. Specifically, FIG. 4 shows the actuator system 10 in a default or "biased" position, wherein the beam modifier 38' creates a first lighting pattern. Specifically, the biasing element 16 applies a force to the main body 12 in a direction away from actuator guide 14, thereby rotating the beam modifier 38' into the default position. FIG. 5 shows the actuator system 10 in a contracted position, wherein an electric current is applied to the shape memory alloy 18 to contract a length of the shape memory alloy 18, thereby causing the main body 12 to retract further into the cavity 30. In turn, the beam modifier 38' is rotated clockwise about the axis 42' to create a second light pattern. It is understood that the beam modifier 38' may be positioned in any number of positions relative to the light source 37 to create any number of light patterns.

Figure 6:
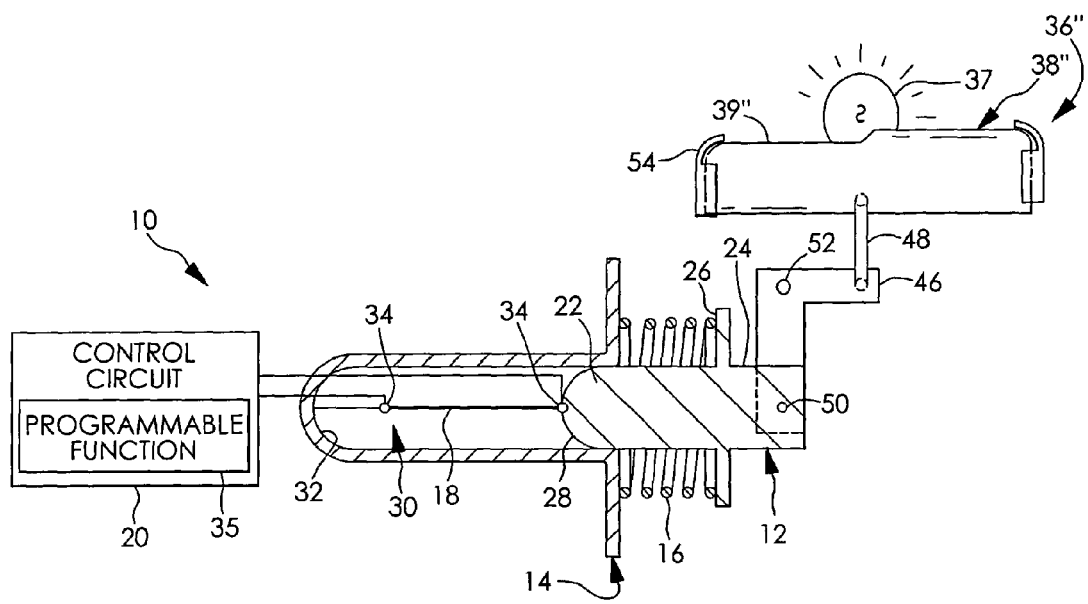
FIG. 6 is a schematic front elevational view of a light control system coupled to the actuator system of FIG. 1 according to another embodiment of the present invention, the actuator system shown in section and the light control system shown in a default position.
Figure 7:
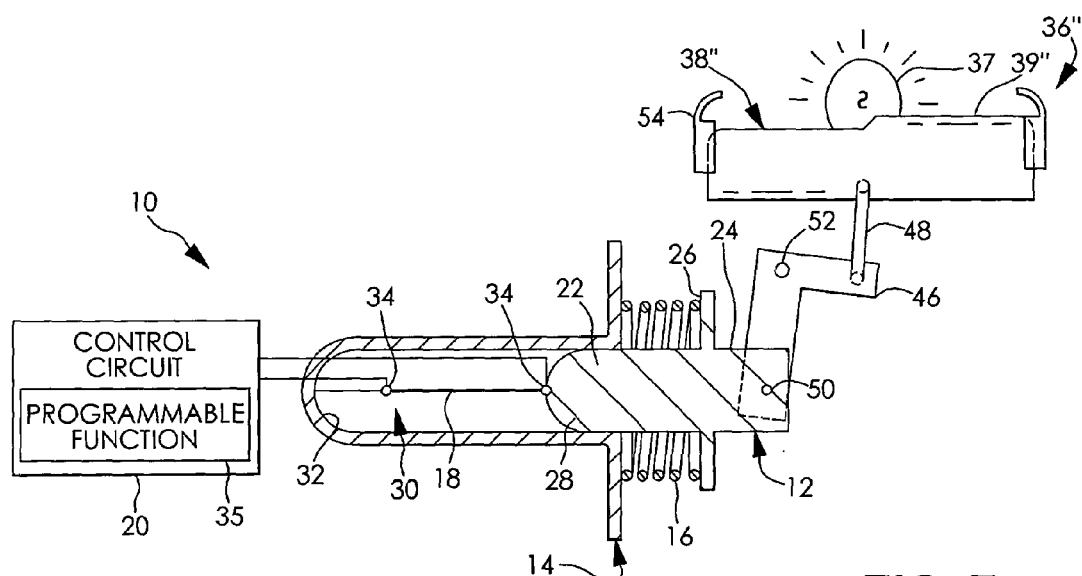
FIG. 7 is a schematic front elevational view of the light control system of FIG. 6 coupled to the actuator system of FIG. 1, the actuator system shown in section and the light control system shown in a contracted position.

FIGS. 6 and 7 show the actuator system 10 coupled to a light control system 36" according to another embodiment of the present invention similar to the light control system 36 of FIGS. 2 and 3, except as described below. Structure repeated from the description of FIGS. 2 and 3 includes the same reference numeral. Variations of structure shown in FIGS. 2 and 3 include the same reference numeral and a double prime (") symbol.

As shown in FIGS. 6 and 7, the light control system 36" includes a beam modifier 38", a rotational element 46, a coupling rod 48, and a guide mechanism 54. As a non-limiting example, the beam modifier 38" includes at least one of a shield (to block portions of a light beam emitted from the light source 37), a reflector (to reflect a portion of the light beam and optionally direct the reflected light rays to create a specific beam pattern/image), a lens (to direct light rays to form a specific beam pattern/image), and a filter (to modify the spectral characteristics of the light beam). As shown, the beam modifier 38" has a stepped edge 39" for modifying a plurality of light rays emitted from the light source 37. However, it is understood that the beam modifier 38" may have any shape, size and features for controlling a modification of the light rays.

The rotational element 46 has a substantially "L" shape. However, other shapes and sizes may be used. The rotational element 46 further includes a coupling element 50 for rotatably coupling the rotational element 46 to the main body 12 of the actuator system 10. The coupling element 50 may be any device for rotatably coupling the rotational element 46 such as a rotatable rivet, for example.

The coupling rod 48 is rotatably coupled to the beam modifier 38" and the rotational element 46. It is understood that the coupling rod 48 may have any shape and size and may be coupled to the beam modifier 38" and the rotational element 46 using any rotatable coupling means, such as a rivet, for example.

The guide mechanism 54 is disposed adjacent the beam modifier 38" for limiting a motion of the beam modifier 38". As shown, the guide mechanism 54 limits the motion of the beam modifier 38" to a linear motion along a pre-determined motion path. The guide mechanism 54 also includes a guide stop 55 for engaging the beam modifier 38" to substantially prevent any further motion of the beam modifier 38" past the guide stop 55.

In use, the attachment portion 24 of the main body 12 of the actuator system 10 is coupled to the rotational element 46 to control a rotational motion of the rotational element 46 about an axis 52. As the rotational element 46 rotates about the axis 52, the coupling rod 48 guides the beam modifier 38" along a pre-determined motion path. It is understood that the specific motion path of the beam modifier 38" may be adapted for various systems and structural constraints. Specifically, FIG. 6 shows the actuator system 10 in a default or "biased" position, wherein, the beam modifier 38" creates a first lighting pattern. Specifically, the biasing element 16 applies a force to the main body 12 in a direction away from actuator guide 14, thereby rotating the beam modifier 38" into the default position. FIG. 7 shows the actuator system 10 in a contracted position, wherein an electric current is applied to the shape memory alloy 18 to contract the shape memory alloy 18, thereby causing the main body 12 to retract further into the cavity 30. In turn, the beam modifier 38" slides in a linear direction away from the guide stop 55 to create a second light pattern. It is understood that the beam modifier 38''' may be positioned in any number of positions relative to the light source 37 to create any number of light patterns.

Figure 8:
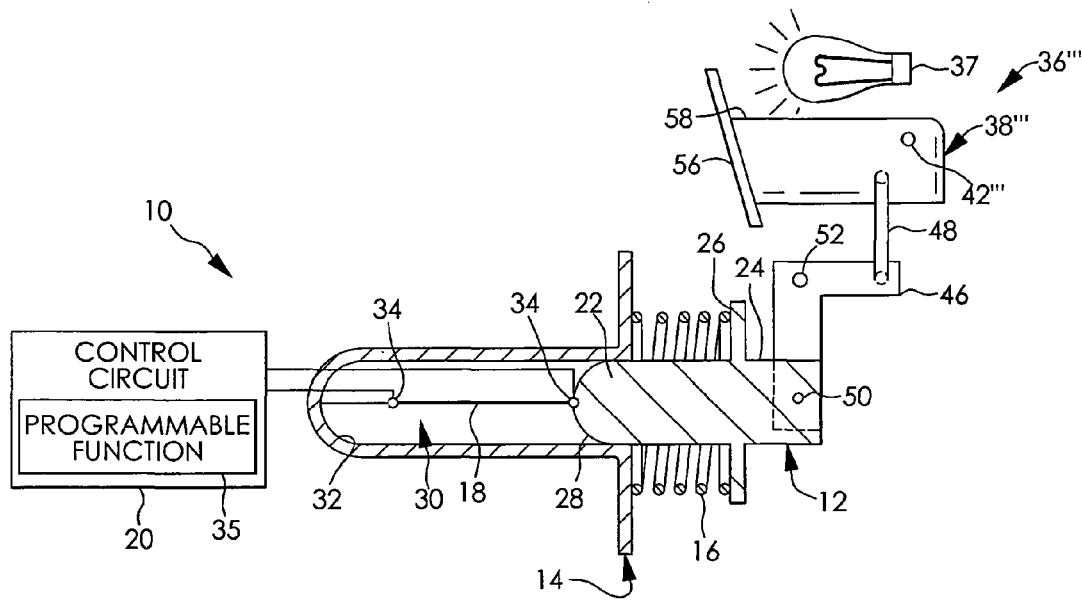
FIG. 8 is a schematic side elevational view of a light control system coupled to the actuator system of FIG. 1 according to another embodiment of the present invention, the actuator system shown in section and the light control system shown in a default position.
Figure 9:
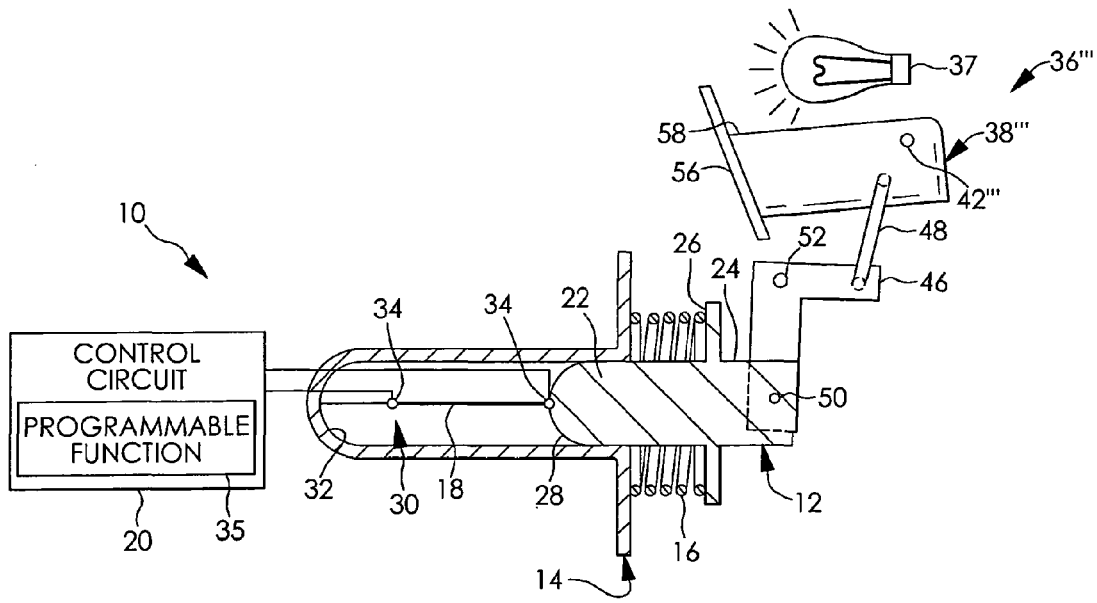
FIG. 9 is a schematic side elevational view of the light control system of FIG. 8 coupled to the actuator system of FIG. 1, the actuator system shown in section and the light control system shown in a contracted position.

FIGS. 8 and 9 show the actuator system 10 coupled to a light control system 36''' according to another embodiment of the present invention similar to the light control system 36 of FIGS. 2 and 3, except as described below. Structure repeated from the description of FIGS. 2 and 3 includes the same reference numeral. Variations of structure shown in FIGS. 2 and 3 include the same reference numeral and a triple prime ('''') symbol.

As shown in FIGS. 8 and 9, the light control system 36''' includes a beam modifier 38''', a rotational element 46, and a coupling rod 48. The beam modifier 38''' includes a substantially rectangular modifier element 56 for modifying a plurality of light rays and a housing 58 for supporting the modifier element 56. As a non-limiting example, the modifier element 56 includes at least one of a shield (to block portions of a light beam emitted from the light source 37), a reflector (to reflect a portion of the light beam and optionally direct the reflected light rays to create a specific beam pattern/image), a lens (to direct light rays to form a specific beam pattern/image), and a filter (to modify the spectral characteristics of the light beam). It is understood that the beam modifier 38''' and modifier element 56 may have any shape, size and features for controlling a modification of the light rays.

The rotational element 46 has a substantially "L" shape. However, other shapes and sizes may be used. The rotational element 46 further includes a coupling element 50 for rotatably coupling the rotational element 46 to the main body 12 of the actuator system 10. The coupling element 50 may be any device for rotatably coupling the rotational element 46 such as a rotatable rivet, for example.

The coupling rod 48 is rotatably coupled to the housing 58 of the beam modifier 38''' and the rotational element 46. It is understood that the coupling rod may have any shape and size and may be coupled to the beam modifier 38''' and the rotational element 46 using any rotatable coupling means, such as a rivet, for example.

In use, the attachment portion 24 of the main body 12 of the actuator system 10 is coupled to the rotational element 46 to control a rotational motion of the rotational element 46 about an axis 52. As the rotational element 46 rotates about the axis 52, the coupling rod 48 guides the beam modifier 38''' along a pre-determined motion path. It is understood that the specific motion path of the beam modifier 38''' may be adapted for various systems and structural constraints. Specifically, FIG. 8 shows the actuator system 10 in a default or "biased" position, wherein, the beam modifier 38' creates a first lighting pattern. Specifically, the biasing element 16 applies a force to the main body 12 in a direction away from actuator guide 14, thereby rotating the beam modifier 38''' into the default position. FIG. 5 shows the actuator system 10 in a contracted position, wherein an electric current is applied to the shape memory alloy 18 to contract a length of the shape memory alloy 18, thereby causing the main body 12 to retract further into the cavity 30. In turn, the beam modifier 38''' is rotated counter clockwise about the transverse axis 42' to create a second light pattern. It is understood that the beam modifier 38''' may be positioned in any number of positions relative to the light source 37 to create any number of light patterns.

The actuator system 10 provides control of a component of a lighting system such as the beam modifier 38, 38', 38'', 38''' to create a plurality of light patterns. Additionally, the actuating system 10 minimizes the electromagnetic compatibility and voltage issues associated with solenoid-based actuators.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An actuator system for a lighting system comprising:
   a shape memory alloy coupled to a component of the lighting system to control an actuation of the component and thereby produce a plurality of light patterns; and
   an electrical control circuit in electrical communication with the shape memory alloy to selectively provide an electrical current to the shape memory alloy for controlling a physical property of the shape memory alloy and thereby the motion of the component of the lighting system.

2. The actuator system according to claim 1, further comprising a biasing device adapted to direct the component of the lighting system into a default position.

3. The actuator system according to claim 1, wherein the electrical control circuit includes a programmable function for controlling the transmission of electrical current.

4. The actuator system according to claim 1, wherein the shape memory alloy is coupled to a beam modifier of the lighting system for controlling a position of the beam modifier relative to a light source, thereby modifying a light pattern created by the beam modifier.

5. The actuator system according to claim 4, wherein the beam modifier includes at least one of a shield to block portions of a light beam emitted from the light source, a reflector to reflect a portion of the light beam, a lens to direct light rays to form a specific beam pattern, and a filter to modify spectral characteristics of the light beam.

6. The actuator system according to claim 1, wherein the shape memory alloy is coupled to a rotational element and the rotational element is coupled to a beam modifier of the lighting system for controlling a position of the beam modifier relative to a light source, thereby modifying a light pattern created by the beam modifier.

7. The actuator system according to claim 1, wherein the shape memory alloy is coupled to a light source for controlling a position of the light source relative to a beam modifier of the lighting system, thereby modifying a light pattern created by the beam modifier.

8. A light control system comprising:
   a light source for emitting a plurality of light rays;
   a beam modifier disposed in a path of the light rays for creating a light pattern;
   a shape memory alloy coupled to at least one of the light source, the beam modifier, and a static surface, wherein the shape memory alloy controls the motion of at least one of the light source and the beam modifier; and an electrical control circuit in electrical communication with the shape memory alloy to selectively provide an electrical current to the shape memory alloy to cause a motion of the shape memory alloy and thereby the motion of at least one of the light source and the beam modifier to modify the light pattern created by the beam modifier.

9. The actuator system according to claim 8, wherein the beam modifier includes at least one of a shield to block portions of a light beam emitted from the light source, a reflector to reflect a portion of the light beam, a lens to direct light rays to form a specific beam pattern, and a filter to modify spectral characteristics of the light beam.

10. The light control system according to claim 8, wherein the electrical control circuit includes a programmable function for controlling the transmission of electrical current.

11. The light control system according to claim 8, wherein the shape memory alloy is coupled to the beam modifier for rotating the beam modifier about an axis to modify the light pattern created by the beam modifier.

12. The light control system according to claim 8, wherein the shape memory alloy is coupled to a rotational element and the rotational element is coupled to the beam modifier for rotating the beam modifier about an axis to modify the light pattern created by the beam modifier.

13. The light control system according to claim 8, wherein the shape memory alloy is coupled to a rotational element and the rotational element is coupled to the beam modifier for guiding the beam modifier along a pre-determined motion path to modify the light pattern created by the beam modifier.

14. A light control system comprising:
a light source for emitting a plurality of light rays;
a beam modifier disposed is path of the light rays for creating a light pattern; and
an actuator system including: a main body having an attachment portion and a guide portion, wherein the attachment portion is coupled to the beam modifier; an actuator guide having a cavity formed therein for receiving the guide portion of the main body to direct a motion of the main body; a biasing device disposed between the main body and the actuator guide; a shape memory alloy coupled to the main body and at least one of the actuator guide and static surface, wherein the shape memory alloy controls the motion of the main body and thereby a motion of the beam modifier; and an electrical control circuit in electrical communication with the shape memory alloy to selectively provide an electrical current to the shape memory alloy for controlling a physical property of the shape memory alloy and thereby the motion of the main body.

15. The actuator system according to claim 14, wherein the actuator guide is disposed in at least one of a housing, a bracket, and a reflector of a headlamp system for a vehicle.

16. The actuator system according to claim 14, wherein the beam modifier includes at least one of a shield to block portions of a light beam emitted from the light source, a reflector to reflect a portion of the light beam, a lens to direct light rays to form a specific beam pattern, and a filter to modify spectral characteristics of the light beam.

17. The light control system according to claim 14, wherein the electrical control circuit includes a programmable function for controlling the transmission of electrical current.

18. The light control system according to claim 14, wherein the attachment portion of the main body is coupled to the beam modifier for rotating the beam modifier about an axis to modify the light pattern created by the beam modifier.

19. The light control system according to claim 14, wherein the attachment portion of the main body is coupled to a rotational element and the rotational element is coupled to the beam modifier for rotating the beam modifier about an axis to modify the light pattern created by the beam modifier.

20. The light control system according to claim 14, wherein the attachment portion of the main body is coupled to a rotational element and the rotational element is coupled to the beam modifier for guiding the beam modifier along a pre-determined motion path to modify the light pattern created by the beam modifier.

* * * * *